(12) United States Patent
Velusamy (10) Patent No.: US 12,434,560 B2
(45) Date of Patent: Oct. 7, 2025

(54) VEHICLE SWITCH SYSTEM FOR CONNECTING MOBILE DEVICE TO VEHICLE AND METHOD OF USING THE SAME

(71) Applicant: FCA US LLC, Auburn Hills, MI (US)

(72) Inventor: Ashokkumar Velusamy, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 198 days.

(21) Appl. No.: 18/342,107

(22) Filed: Jun. 27, 2023

(65) Prior Publication Data
US 2025/0001860 A1 Jan. 2, 2025

(51) Int. Cl.
| | |
|---|---|
| *B60K 35/00* | (2024.01) |
| *B60Q 3/16* | (2017.01) |
| *B60Q 3/60* | (2017.01) |
| *B60Q 3/70* | (2017.01) |
| *B60K 35/22* | (2024.01) |
| *B60K 35/28* | (2024.01) |

(52) U.S. Cl.
CPC ............ *B60K 35/00* (2013.01); *B60Q 3/16* (2017.02); *B60Q 3/60* (2017.02); *B60Q 3/70* (2017.02); *B60K 35/22* (2024.01); *B60K 35/28* (2024.01); *B60K 2360/164* (2024.01); *B60K 2360/166* (2024.01)

(58) Field of Classification Search
CPC .. B60K 35/00; B60K 35/28; B60K 2360/164; B60K 2360/166; B60K 35/22; B60Q 3/70; B60Q 3/16; B60Q 3/60
See application file for complete search history.

(56) References Cited

U.S. PATENT DOCUMENTS

| | | |
|---|---|---|
| 10,572,123 B2 | 2/2020 | Penilla et al. |
| 11,505,983 B1 * | 11/2022 | Crockett ................ H01H 25/04 |
| 2006/0176687 A1 | 8/2006 | Cope |

(Continued)

FOREIGN PATENT DOCUMENTS

| | | | |
|---|---|---|---|
| DE | 102019206190 B3 * | 8/2020 | |
| KR | 20080007534 A * | 1/2008 | |
| KR | 20190061581 A | 6/2019 | |

OTHER PUBLICATIONS

International Search Report and Written Opinion dated Oct. 17, 2024 for International Application No. PCT/US2024/035178, International Filing Date Jun. 24, 2024.

*Primary Examiner* — Chico A Foxx
(74) *Attorney, Agent, or Firm* — Jeremy J. Klobucar (57) ABSTRACT

A vehicle switch system for a mobile device that helps connect the mobile device to a vehicle so that certain features of the mobile device, like those pertaining to navigation and entertainment, can be easily accessed through the vehicle. The vehicle switch system is particularly well suited for use with vehicles that lack in-vehicle infotainment (IVI) systems, as users of such vehicles oftentimes cannot access the features of their mobile devices through their vehicle. The vehicle switch system may include a vehicle switch with a switch component and a switch indicator and a docking station, where a "short press" of the switch component enables the docking station to charge the mobile device and a "long press" of the switch component initiates a process to wirelessly connect the mobile device to the vehicle electronics system. The switch indicator displays a connection status of the mobile device.

18 Claims, 5 Drawing Sheets

(56) References Cited

U.S. PATENT DOCUMENTS

| | | | |
|---|---|---|---|
| 2011/0263293 A1* | 10/2011 | Blake | B60R 11/02 |
| | | | 455/557 |
| 2013/0151111 A1* | 6/2013 | Skelton | B60R 16/02 |
| | | | 701/99 |
| 2013/0297844 A1* | 11/2013 | Rosenberg | G06F 1/1632 |
| | | | 710/303 |
| 2014/0059263 A1* | 2/2014 | Rosenberg | G06F 1/1632 |
| | | | 710/303 |
| 2014/0256380 A1* | 9/2014 | Ortega | B60R 11/0241 |
| | | | 455/557 |
| 2014/0280552 A1* | 9/2014 | Ng | H04L 67/12 |
| | | | 709/204 |
| 2014/0329487 A1 | 11/2014 | Paek et al. | |
| 2017/0149946 A1 | 5/2017 | Buttolo et al. | |
| 2017/0255339 A1* | 9/2017 | Grover | G06F 9/452 |
| 2018/0053360 A1* | 2/2018 | Jergess | G08B 5/36 |
| 2018/0299289 A1* | 10/2018 | Hill | G01C 21/3608 |
| 2019/0311868 A1 | 10/2019 | Vansickel et al. | |

\* cited by examiner

VEHICLE SWITCH SYSTEM FOR CONNECTING MOBILE DEVICE TO VEHICLE AND METHOD OF USING THE SAME

FIELD

The present disclosure relates to a vehicle switch system and, more particularly, to a vehicle switch system that helps connect a mobile device, such as a smart device, to the vehicle so that certain features of the mobile device can be accessed through the vehicle.

BACKGROUND

The presence and use of mobile devices has proliferated in recent years and will likely continue for years to come. Accordingly, a wide variety of mobile devices are regularly being brought by users into the vehicles in which they are riding. Many of the features now available through mobile devices, like those pertaining to navigation and entertainment, are applicable to vehicles and would be beneficial to vehicle users if made available through vehicle.

Modern in-vehicle infotainment (IVI) systems are typically designed to access and interact with mobile devices, but they can be rather expensive to add to a vehicle. Thus, many vehicles, particularly those in certain markets, do not come equipped with IVI systems as standard equipment. For the users of these vehicles that lack an IVI system, there may be a desire to access the navigation, entertainment and/or other features of the mobile device through the vehicle, thereby enhancing their driving experience.

SUMMARY

In at least some implementations, there is provided a vehicle switch system for connecting a mobile device to a vehicle electronics system, comprising: a vehicle switch including a switch housing, a switch component, a switch indicator, and a plurality of switch connections; the switch housing includes an outer switch housing piece that at least partially surrounds the switch component and the switch indicator; the switch component is a switching device; the switch indicator is a visual indicating device and includes an illuminated piece, the illuminated piece is configured to indicate the connectivity status of the mobile device and/or the vehicle electronics system; and the plurality of switch connections includes a first switch connection that is configured for direct or indirect connection to at least one of a vehicle power supply or a docking station, and a second switch connection that is configured for direct or indirect connection to the vehicle electronics system; and wherein the vehicle switch system is configured to facilitate connecting the mobile device to the vehicle electronics system so that one or more feature(s) and/or function(s) of the mobile device can be accessed and utilized through the vehicle electronics system.

In at least some implementations, there is provided a method of using a vehicle switch system that includes a vehicle switch having a switch component and a switch indicator, the switch component is a switching device and includes an actuator piece configured for engagement by a user, the switch indicator is a visual indicating device and includes an illuminated piece configured to indicate the connectivity status of a mobile device and/or a vehicle electronics system, the method comprising the steps of: detecting when a user engages the switch component; determining a user selection based on a duration or amount of time with which the user engages the switch component; when a short press is determined, enabling a docking station to charge the mobile device and displaying a first color and/or pattern with the switch indicator to indicate that the mobile device is not connected to the vehicle electronics system; and when a long press is determined, enabling a docking station to charge the mobile device, initiating a process to connect the mobile device to the vehicle electronics system, and displaying a second color and/or pattern with the switch indicator to indicate that the mobile device is connected to the vehicle electronics system or is in the process of being connected to the vehicle electronics system.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Referring in more detail to the drawings, there is described a vehicle switch system for a mobile device, such as a smart device or wearable, where the vehicle switch system helps connect the mobile device to the vehicle so that certain features of the mobile device, like those pertaining to navigation and entertainment, can be more easily accessed through the vehicle and enjoyed by the vehicle users. The vehicle switch system may be used with a wide variety of mobile devices and/or vehicles, but it is particularly well suited for use with vehicles that lack in-vehicle infotainment (IVI) systems, as users of such vehicles oftentimes cannot access the features of their mobile devices through their vehicle. The vehicle switch system and/or method described herein are designed to address this drawback.

Figure 1:
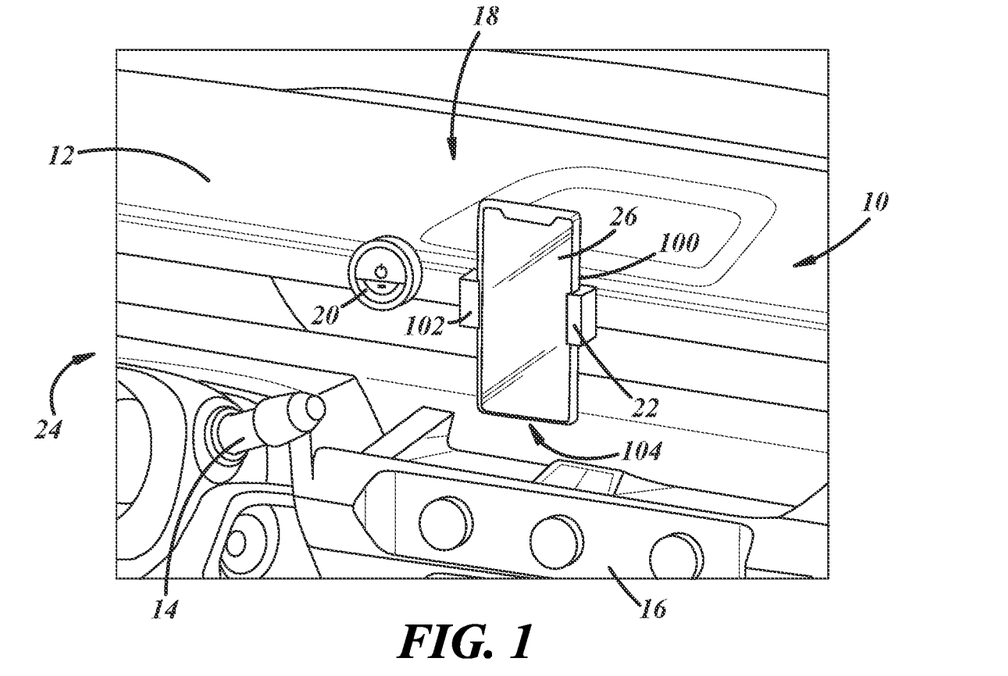
FIG. 1 is a partial view of a vehicle interior and shows an example of a vehicle switch system for a mobile device that is mounted to a dashboard.

With reference to FIG. 1, there is shown a partial view of a vehicle interior 10 with a dashboard 12, a steering column 14 and an instrument panel 16, where an example of a vehicle switch system 18 having a vehicle switch 20 and a docking station 22 are mounted to the dashboard 12.

Vehicle switch 20 is a switch, button and/or other type of electronic control that is preferably mounted within the vehicle interior 10 and is configured for connection (wired and/or wireless) to both a vehicle electronics system 24 and a mobile device 26. Although the vehicle switch 20 and docking station 22 are mounted to the dashboard 12 in FIG. 1, this is not mandatory. For instance, it is possible for the vehicle switch 20 and/or docking station 22 to be mounted or installed in other locations throughout the vehicle interior 10, such as on the steering column 14, on a steering wheel (not shown), on the instrument panel 16, on a center counsel located between the driver and passenger seats (not shown) and/or any other suitable location. In some embodiments, like that shown in FIG. 1, the vehicle switch 20 and docking station 22 are located next to or near one another (e.g., mounted proximate to one another on the same vehicle interior component), whereas in other embodiments the vehicle switch 20 and docking station 22 are located apart from one another (e.g., one component is mounted on one vehicle interior component and the other component is mounted on a different vehicle interior component). It is even possible for there to be multiple vehicle switches 20 and/or docking stations 22 located throughout the vehicle so that multiple mobile devices can be connected to the vehicle. Other embodiments and arrangements are certainly possible as well. According to the non-limiting example in FIG. 2, the vehicle switch 20 includes a switch housing 30, a switch component 32, a switch indicator 34, one or more switch connections 36, 38 (e.g. a first switch connection 36, a second switch connection 38), and switch circuitry (not shown in FIG. 2).

Switch housing 30 acts as a body, frame, case and/or other type of housing component for the vehicle switch 20 and preferably includes an outer switch housing piece 40 and a back switch housing piece (not shown). According to this particular embodiment, the outer switch housing piece 40 is made of a plastic material and is circular such that it surrounds the switch component 32 and the switch indicator 34. In other embodiments, the outer switch housing piece 40 may be made of a different material and/or have a shape that is oval, oblong, rectangular, square, diamond or some irregular configuration, as it is not necessary that it be circular. The outer switch housing piece 40 is preferably stationary and connected to the back switch housing piece (not shown). The outer switch housing piece 40 at least partially surrounds and protects the other vehicle switch components on an outer peripheral side of the assembly (in the case of the FIG. 2 example, the outer switch housing piece 40 completely surrounds the other vehicle switch components). The back switch housing piece may include a circuit board that is part of the switch circuitry or it could simply be a housing component. The outer switch housing piece 40 and the back switch housing piece (not shown) may be separate components, or they may be formed together as a unitary piece. There is preferably no switch housing piece on the front side of the vehicle switch 20 so that it is open and provide users with access to the switch component 32 and the switch indicator 34. In a different embodiment, the front side of the vehicle switch 20 has a transparent or see-through film or cover (not shown) that protects the switch, but still enables users to see and access the switch component 32 and the switch indicator 34.

Figure 2:
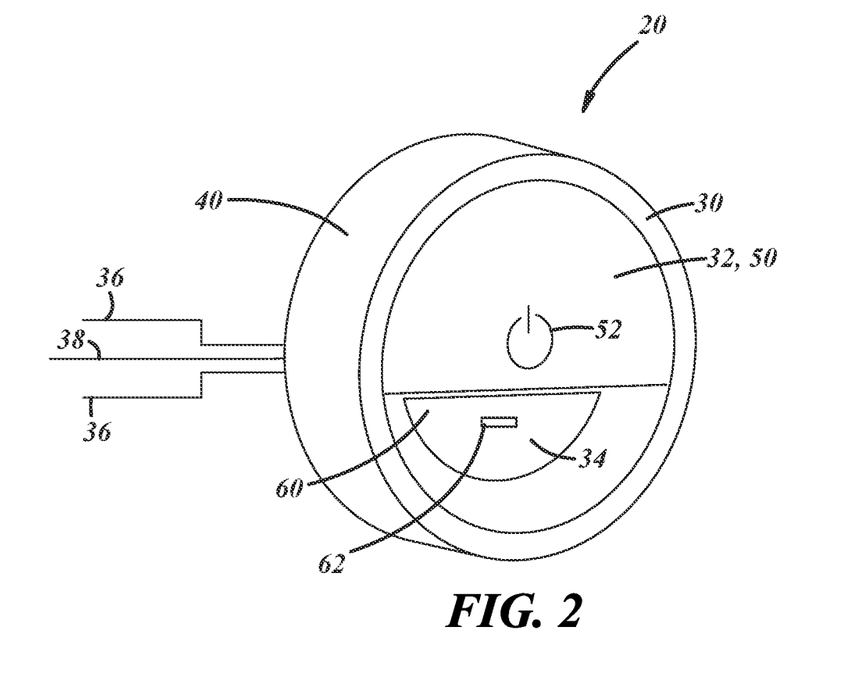
FIG. 2 is an enlarged perspective view of a vehicle switch, which is part of the vehicle switch system of FIG. 1.

Switch component 32 is a push-button, selector, control and/or other type of electro-mechanical switching device for the vehicle switch 20 and preferably includes an actuator piece 50 and an internal switching mechanism (not shown). Switch component 32 may be a momentary switch, a maintained switch, a normally open switch, a normally closed switch, a single-pole single-throw, a single-pole double-throw, a double-pole single-throw, a double-pole double-throw or any other type of suitable switch, depending on the number of mobile devices that it is connected to and the particular application in which it is used. According to the illustrated embodiment, the switch component 32 is preferably an on/off power button that is provided in the form of a momentary, normally open push-button switch whose number of poles and/or throws is dictated by the specific application in which it is used. The switch component 32 may have a semi-circular shape with an upper portion of its periphery being arcuate and a lower portion of its periphery being flat or linear, as best illustrated in FIG. 2. The actuator piece 50 may include indicia 52 (e.g., the power symbol, the words on/off, etc.) on its front face that indicates its corresponding functionality. The indicia 52 may be backlit and/or otherwise illuminated, but preferably the indicia 52 is not illuminated since the status of the vehicle switch 20 is conveyed by the switch indicator 34, although this is not mandatory. The internal switching mechanism (not shown) may include stationary contacts, movable contacts and an internal spring, where the movable contacts are connected to the actuator piece 50 so that, when the actuator is engaged by a user against a spring force exerted by the internal spring, the movable contacts make an electrical connection across the stationary contacts. Other internal switching mechanism arrangements are certainly possible.

Switch indicator 34 acts as a signal, display and/or other type of visual indicator for the vehicle switch 20 and preferably includes a non-illuminated piece 60 and an illuminated piece 62. The non-illuminated piece 60 may simply be a non-illuminated, stationary piece or component with a cutout for the illuminated piece 62. The illuminated piece 62, on the other hand, is preferably a light emitting diode (LED) that indicates the status of the vehicle switch 20 and/or the docking station 22 by the illumination pattern (e.g, solid illumination, fast flashing illumination, slow flashing illumination, etc.), as well as the illumination color (e.g., a first color for a connection mode, a second color for a pairing mode, a third color for an error situation, etc.). According to a non-limiting example, the non-illuminated piece is an opaque plastic piece of a dark color (e.g., grey or black) and the illuminated piece 62 includes an LED that can flash several different colors (e.g., green, blue and/or red). The switch indicator 34 may also have a semi-circular shape with a lower portion of its periphery being arcuate and an upper portion of its periphery being flat or linear. In this example, the semi-circular shapes of the switch component 32 and the switch indicator 34 are complimentary such that a combined shape of both pieces forms a full circular shape, which is bounded by the switch housing 30. It should be appreciated that the switch indicator 34 is not limited to any particular embodiment, including that illustrated in the FIG. 2 and described herein, as that is but one possible embodiment.

Figure 3:
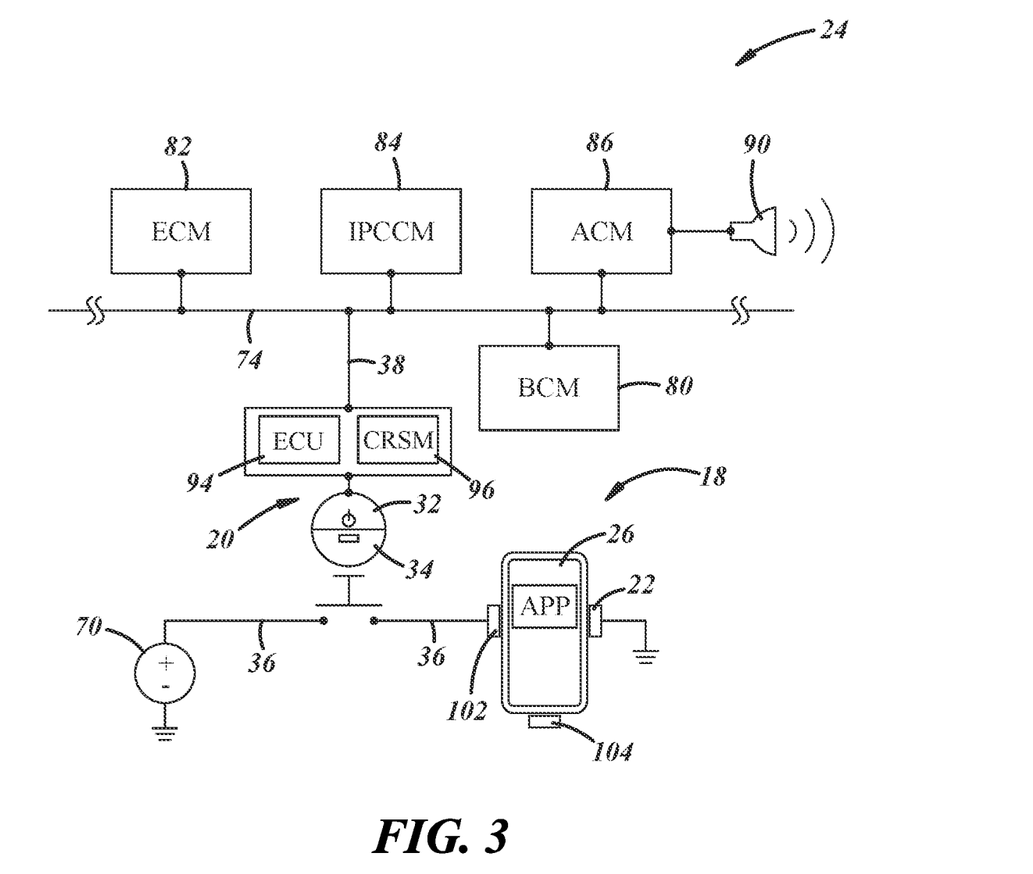
FIG. 3 is a schematic diagram of the vehicle switch system of FIG. 1 connected to a vehicle power supply, the mobile device, and a vehicle communications network.

Switch connections 36, 38 are coupled to the vehicle switch 20 and may be used for conveying power and/or data. For instance, one of the switch connections 36 may be connected to a vehicle power supply 70 (e.g., a low voltage DC power supply) and the other switch connection 36 may be connected to the docking station 22 so that the vehicle switch 20 is connected in between (as shown in the schematic diagram of FIG. 3). In this arrangement, when the vehicle switch 20 is closed, power may be provided from the power supply 70, through the vehicle switch 20, to the docking station 22 so that the mobile device 26 can be charged; and when the vehicle switch 20 is open, power from the power supply 70 is interrupted so that the mobile device 26 cannot be charged by the docking station 22. Other configurations and connections, such as ground wire connections and the like may also be provided, as FIG. 3 is simply meant to be a schematic illustration of a basic configuration. For instance, instead of power flowing through vehicle switch 20 (direct connection), it is possible for the vehicle switch 20 to be coupled to and to control one or more other switching mechanism(s) through which the power actually flows (indirect connection). Any number of other suitable connection configurations are possible and may be used.

Switch connection 38 may be coupled to the vehicle electronics system 24 via a vehicle communications network 74, such as a controller area network (CAN) or a local interconnect network (LIN). The vehicle communications network 74 interconnects various microcontrollers, electronic control units (ECUs), vehicle electronic modules, electronic nodes and/or other types of electronic devices 80-86 that are located throughout the vehicle and are a part of the vehicle electronics system 24. According to the non-limiting example shown in FIG. 3, the vehicle communication network 74 may be coupled to a body control module (BCM) 80, an engine control module (ECM) 82, an instrument panel cluster control module (IPCCM) 84, an audio control module (ACM) 86, other vehicle modules, as well as any suitable combination thereof. One potential reason for the vehicle switch 20 to be coupled to the BCM 80 is because the mobile device 26 will need to connect to the vehicle electronics system 24 and many BCMs already have wireless communication capabilities, like Bluetooth, thereby providing the mobile device with an access point to the system. It should be appreciated, however, that vehicle modules 80-86 and/or speakers 90 are simply examples of some of the types of electronic devices that vehicle switch 20 may be coupled to via the vehicle communication network 74, but they are not required, as the vehicle switch 20 may be coupled to any number of other device combinations instead. Rather than a wired vehicle communications network 74, it is also possible for the vehicle switch 20 to be connected to a wireless vehicle communications network.

Switch circuitry may include any suitable combination of wires or connectors, circuit components, electronic controllers or processors, electronic memory or storage devices, circuit boards, etc. that may be used with the vehicle switch system 18. For example, in addition to standard arrangements of circuit components like diodes, capacitors, resistors, etc., it is possible for the switch circuitry to include one or more electronic control unit(s) 94, which may include any suitable type of electronic module, electronic controller, electronic processor, microprocessor, microcontroller, application specific integrated circuit (ASIC) and/or other electronic processing device. The electronic control unit 94 may be a small electronic processing device that is integrated within the switch housing 30 (e.g., unit 94 may be mounted on a common printed circuit board (PCB) or the like with the other switch circuitry components), or the electronic control unit 94 may be provided outside of and connected to the rest of the switch circuitry components. The switch circuitry may also include one or more electronic memory or storage devices in the form of a computer-readable storage medium (CRSM) 96. The computer-readable storage medium 96 may include any suitable type of electronic memory capable of storing electronic instructions, such as the type used to carry out and perform method 200 described below. It should be recognized that the switch circuitry, including the electronic control unit 94 and/or the computer-readable storage medium 96 may be located within the vehicle switch 20 (e.g., mounted on a common circuit board that is within the switch housing 30) or located outside of the vehicle switch 20 (e.g., as a part of another electronic module or the like).

The electronic control unit 94 may be connected to the switch component 32 in order to receive input from the user (e.g., to receive and interpret engagement of the switch component as a "short press" or a "long press," as discussed more below). These user selection signals from the switch component 32 may act as inputs to the electronic control unit 94. The electronic control unit 94 may also be connected to the switch indicator 34 so that it can send it indicator command signals (e.g., command signals that dictate an illumination pattern for the switch indicator 34, which in turn indicates the current status of the system). These indicator command signals may act as outputs of the electronic control unit 94. In addition, the electronic control unit 94 may be connected to the vehicle electronics system 24 via switch connection 38 and vehicle communication network 74. This enables the electronic control unit 94 to communicate and interact with the other components of system 24, including the various modules 80-86, the speakers 90, etc. These system signals or messages may act as outputs of the electronic control unit 94 when being sent to the system 24 or they may act as inputs to the electronic control unit 94 when being received from the system 24. Of course, any number of other arrangements and configurations are possible, as the aforementioned description describes just one possibility.

Docking station 22 is a station, holder and/or other type of electronic device that is preferably mounted within the vehicle interior 10 and is configured for connection (wired and/or wireless) to the mobile device 26. As previously mentioned, the docking station 22 may be mounted to the dashboard 12 in a location near the vehicle switch 20, but this is not required, as it may be mounted in any suitable location within the vehicle interior. According to one non-limiting example, the docking station 22 includes a station frame 100 (behind the mobile device in FIG. 1), one or more station retaining features or piece(s) 102, and a station charging feature 104. The station frame 100 may be in the form of a backplate, a body, a wall, connecting pieces and/or other type of frame component that connects station retaining pieces 102 and/or other components of the docking station 22 together, and it may be of any suitable shape and size. The station retaining piece(s) 102 are designed to physically grasp, hold and/or retain the mobile device 26 so that it remains secured in place. FIG. 1 shows a pair of station retaining pieces 102, one on each side of the mobile device 26, but this is only one possible configuration, as additional retaining pieces could be provided below and/or above the mobile device as well. In a different example, the station retaining piece(s) may include one or more magnetic elements, adhesive, loop/fastener and/or other type of retention or fastening feature and it may be designed to interact with corresponding features attached to the mobile device. The station charging feature 104 includes an electric connection for connecting to and charging the mobile device 26, and the electric connection can be wired or wireless. In the case of a wired connection, the station charging feature 104 may include one or more of the following charging ports: a micro-USB port, a TYPE-C port, a Lightning port and/or any other suitable charging port for mobile devices. In the case of a wireless connection, the station charging feature 104 may include electromagnetic induction components, like those found in wireless charging ports provided according to Qi or other wireless charging systems.

Figure 4:
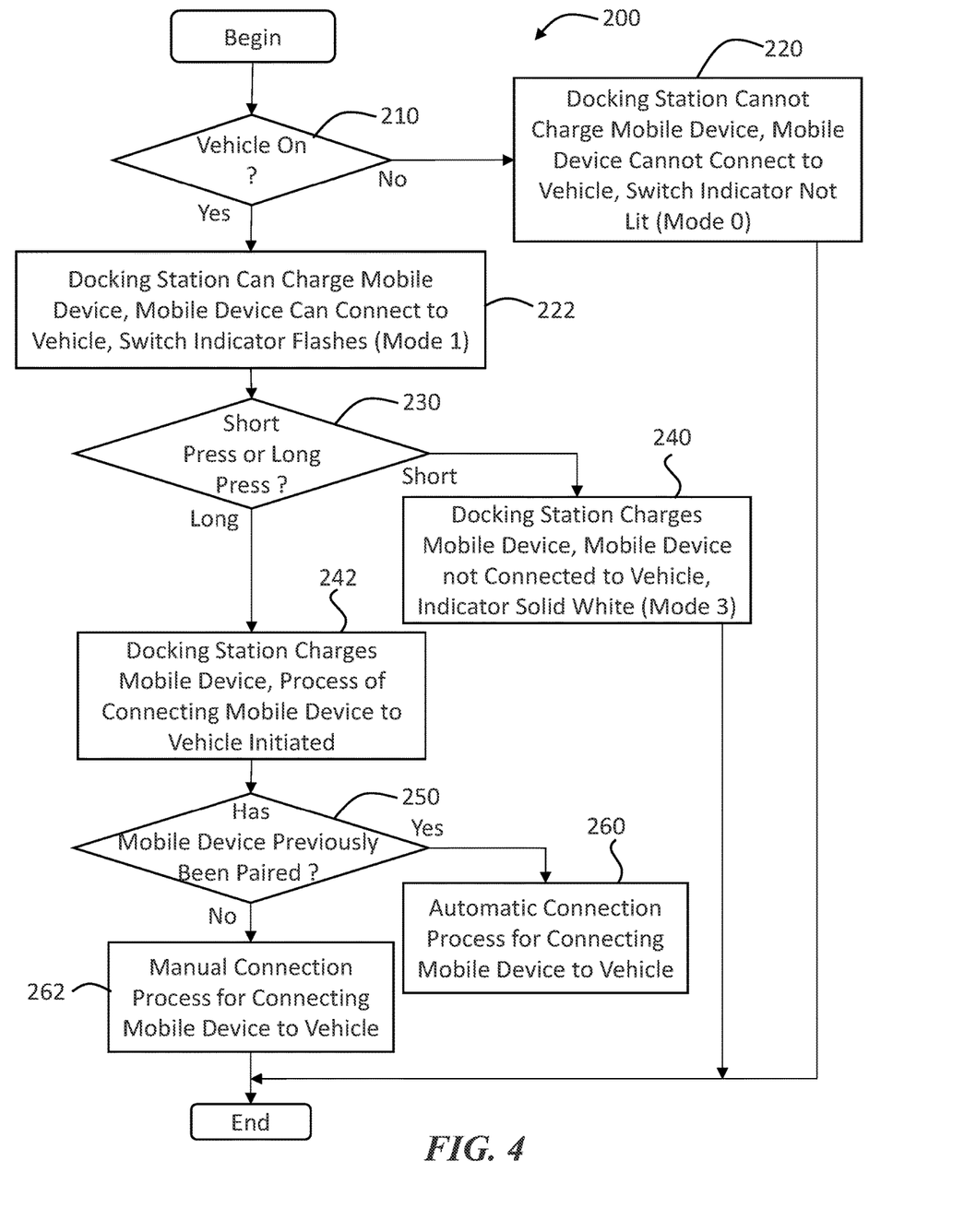
FIG. 4 is flowchart of an example of a method that may be used with the vehicle switch system of FIG. 1.

With reference to FIG. 4, there is shown an example of a method 200 of using the vehicle switch 20 and docking station 22 to help connect a mobile device 26 to the vehicle electronics system 24. Electronic instructions used for carrying out and performing method 200 may be stored on the computer-readable storage medium (CRSM) 96 and may be executed by the electronic control unit (ECU) 94. Starting with step 210, the method determines the state or status of the vehicle. If the vehicle is not "on," which can be determined by having the vehicle switch 20 query the ACC/IGN status of the vehicle via the BCM 80, the ECM 82 and/or some other vehicle electronic module using system signals, then control passes to step 220; if the vehicle is "on," then control of the method passes to step 222. Of course, other techniques and/or parameters may be used to determine if the vehicle is "on" and/or otherwise available for connection to the mobile device.

In step 220, the method establishes that the mobile device cannot be connected to the vehicle, since the vehicle is not "on," and sets a Mode setting to a certain value, such as "0." With Mode set to 0, the switch indicator 34 is not lit up, thus, conveying to the user that the vehicle electronics system 24 is not available for connection with the mobile device 26 (in other embodiments, the switch indicator 34 may be lit with a color, like red, that indicates the system is not available for connecting). In the example described below, the docking station 22 is unable to charge the mobile device when the vehicle is "off," but this is optional. Following step 220, the method may end or loop back to the beginning for further monitoring.

If the method determines that the vehicle is "on" and/or is otherwise available for connection to the mobile device, the Mode setting is set to a certain value, such as "1," step 222. Of course, the method may check and confirm other factors, in addition to the vehicle being "on," before establishing the Mode setting as "1." Step 222 may send an indicator command signal to the switch indicator 34 that causes it to flash or intermittently display a color, like blue, thereby indicating to the user that the mobile device 26 and/or vehicle electronics system 24 are in a discoverable mode that allows them to establish a wireless connection (e.g., a Bluetooth connection). In some embodiments, a wireless connection will only be able to be established when the mobile device 26 is in the docking station 22; in other embodiments, a wireless connection can be established whenever the mobile device is in the vicinity of the vehicle switch 20 (e.g., located within the vehicle).

Step 230, which is carried out in response to a user pressing or otherwise engaging the switch component 32, determines if the user has engaged in a "short press" or a "long press." One of the goals of the vehicle switch 20 is to provide a substantial amount of functionality and features, particularly for vehicles lacking in-vehicle infotainment (IVI) systems, with a simple and cost-effective switch design. According to the non-limiting example shown in FIG. 2, the only part of the vehicle switch 20 that may be pressed or otherwise engaged by the user is the switch component 32. Therefore, the method has to use creative techniques for deciphering or distinguishing user selections, since only one input button is provided. The duration or amount of time that the user presses down on the switch component 32 is one possibility for distinguishing user elections (e.g., short versus long presses); the extent or amount of distance of which the user depresses the switch component 32 is another possibility for distinguishing user selections (e.g., first versus second detent positions); the pattern or sequence of user presses is yet another possibility for distinguishing user selections (e.g., one versus two or three presses in a row); or a combination of the above may be used. In each of the preceding examples, the user is able to make one of several user selections through the use of a single button (i.e., the switch component 32). In the present example, the method uses the duration or amount of time that the user presses down on the switch component 32 to determine if the user wants to simply turn "on" the docking station 22 for charging the mobile device 26 (e.g., a duration of less than 1 sec) or if the user wants to establish a wireless connection between the mobile device 26 and the vehicle electronics system 24 (e.g., a duration of greater than 1 sec). If step 230 detects a "short press," then control of the method passes to step 240; if a "long press" is detected, then control passes to step 242.

At step 240, a "short press" of the switch component 32 has been detected and, in response, the method turns "on" the docking station 22 so that it can charge the mobile device 26 and the Mode setting is set to a predetermined value, such as "3." According to one example, the vehicle switch 20 is configured such that a "short press" of the switch component 32 turns on the docking station 22 for charging, but does not initiate the process of connecting the mobile device 26 to the vehicle electronics system 24. If the docking station is already turned "on," then step 240 simply maintains the docking station in an "on" state (turning "on" the docking station and/or maintaining the docking station in an "on" state is referred to as "enabling a docking station to charge a mobile device"). Step 240 may send a signal to the switch indicator 34 that causes it to display a new color, like white, thereby indicating that the docking station 22 is "on" and charging the mobile device 26, but the mobile device is not connected to the vehicle electronics system 24. Step 240 may initiate other features as well, such as launching a corresponding app or program on the mobile device 26 to provide the user with additional options, or checking to see if the mobile device 26 is already connected to the vehicle electronics system 24 (if it is already connected when the "short press" is detected, step 240 may disconnect the mobile device or send the user a prompt asking them if they would like the mobile device to be disconnected). Assuming the method detects no other user selections, the method may end or loop back to the beginning for further monitoring, during which the docking station 22 continues to charge the mobile device 26.

At step 242, a "long press" of the switch component 32 has been detected and, in response, the method turns "on" the docking station 22 to charge the mobile device 26 (or keeps the docking station "on," in the event it was already "on") and initiates a process of wirelessly connecting the mobile device 26 to the vehicle electronics system 24. In the present example, the vehicle switch 20 is configured such that a "long press" of the switch component 32 by the user turns on the docking station 22 for charging and starts either an automatic or manual connection process for connecting the mobile device 26 to the vehicle electronics system 24. Step 242 may send a signal to the switch indicator 34 that causes it to continue displaying a flashing color (e.g., flashing blue) indicating that the devices are available for connection or even to send a signal that causes the switch indicator 34 to flash at a more rapid rate to indicate that a pairing or connecting process is underway. As an optional feature, step 242 may check to see if the mobile device 26 is already connected to the vehicle electronics system 24. If the mobile device is already connected when the "long press" is detected, step 240 may interpret the "long press" as the user wanting to disconnect the mobile device, in response to which the method may send the user a prompt asking them if they would like the mobile device to be disconnected or simply disconnect the mobile device 26 from the vehicle electronics system 24.

Step 250 checks to see if the mobile device 26 has previously been paired to the vehicle electronics system 24. Skilled artisans will appreciate that there are a number of methods and techniques for checking the past pairing or connectivity history of a mobile device, including evaluating a list of previously paired Bluetooth devices that is stored and maintained in the vehicle electronics system 24 and/or the mobile device 26. If step 250 determines that mobile device 26 has previously been paired with the vehicle, then control of the method may pass to step 260, which initiates an automatic connection process; if the mobile device has not previously been paired with the vehicle, then control passes to step 262, which initiates a manual connection process. In terms of step 250, the method may be designed to only determine the past pairing or connectivity history of a mobile device that is currently connected to the docking station 22, or the method could be designed to determine if any mobile devices located within the vehicle, including those not connected to the docking station 22, have previously been paired. Other possibilities exist as well.

Figure 5:
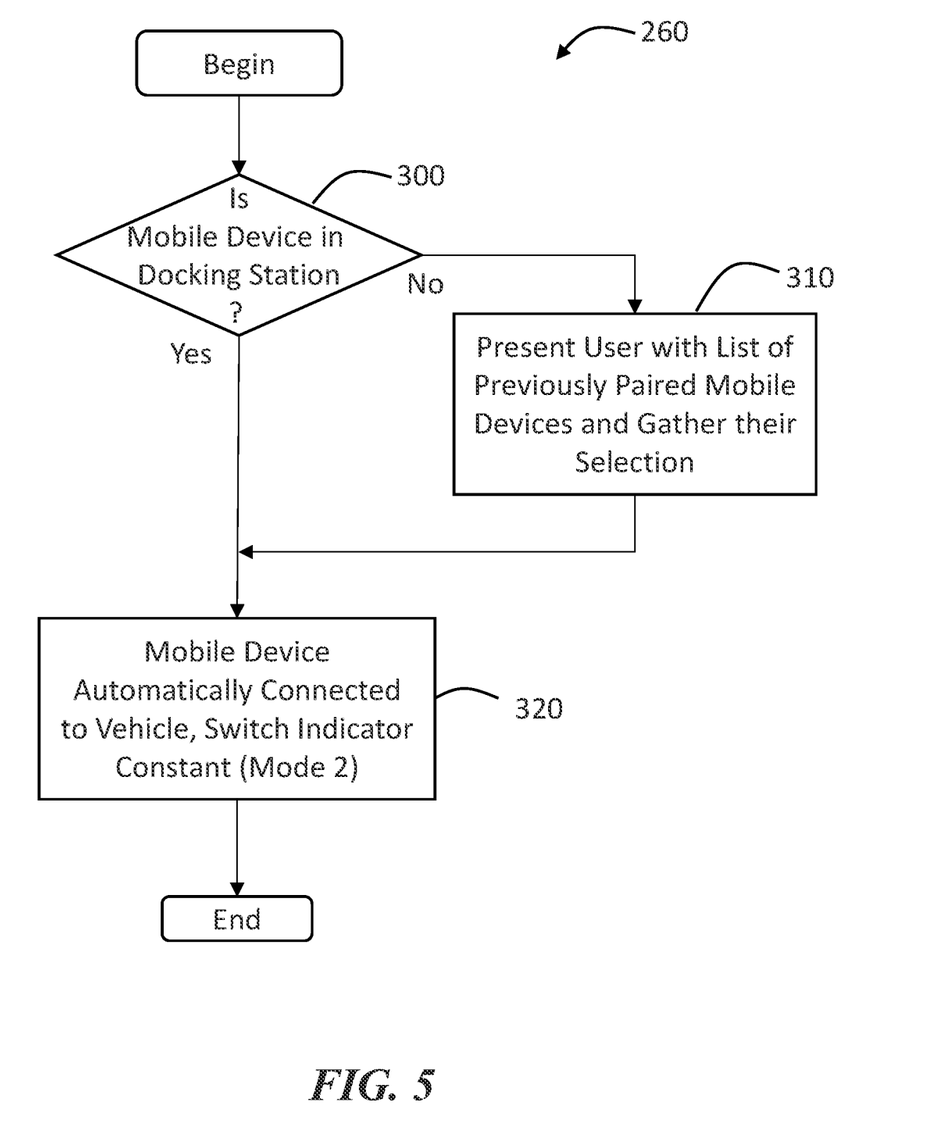
FIG. 5 is a flowchart of an example of an automatic connection process step that may be used with the method of FIG. 4.

With reference to FIG. 5, there is shown a more detailed flowchart of an example of how the automatic connection process of step 260 may be carried out. Step 260 involves a scenario where the vehicle electronics system 24 has already been paired, at some time in the past, to a mobile device located within the vehicle, which is why an automatic connection process is appropriate. However, it may still be prudent for the method to confirm the identify of the mobile device that is to be connected before proceeding with the automatic connection process. There are a number of ways that this identify confirmation process can be performed. For instance, if there is only one mobile device in the vehicle at that time, then the method may assume that this is the intended device by process of elimination. When a mobile device 26 is currently connected or mounted in the docking station 22, this too can act as confirmation that this is the device intended for connection, see step 300. If the outcome of step 300 is "yes," then then method assumes that the mobile device in the docking station 22 is the same one that the user is attempting to connect to the vehicle, and the automatic connection process continues at step 320. If the outcome is "no," then the method proceeds to step 310 to identify which mobile device the user is attempting to connect to the vehicle.

For context, step 310 is encountered when: the vehicle is "on" (step 210), the user has engaged a "long press" of the switch component 32 (step 230) thereby indicating their desire to connect a mobile device to the vehicle, at least one mobile device located in the vehicle has been previously paired with the vehicle (step 250), but there is no mobile device currently connected to the docking station 22 (step 300). In this scenario, the method assumes that the user wants to connect a mobile device to the vehicle, but since there is no mobile device connected to the docking station, the method is unsure which device the user wants to connect (particularly relevant when there are a number passengers in the vehicle, many of whom have mobile devices). Thus, step 310 presents the user with a list of previously paired mobile devices for their selection and does so according to one of a number of different techniques. For example, the vehicle switch 20 may send a signal or message over the vehicle communications network 74 to the instrument panel cluster control module (IPCCM) 84 so that the list of previously paired mobile devices is visually displayed on an existing screen of the instrument panel 16. The user can then make their selection using standard input features, like up/down/enter buttons on the steering wheel or the instrument panel. In a different example, the vehicle switch 20 sends a signal to the audio control module (ACM) 86 which causes the speakers 90 to audibly present the list of previously paired mobile devices to the user. The user can make their selection by audibly identifying the mobile device they want, which can then be interpreted by a human-machine interface of some type, to cite one example. In both of these examples, the vehicle switch 20 engages existing equipment on the vehicle (the instrument panel, buttons, speakers, microphone, etc.) to present a list of previously paired mobile devices to the user and to gather their selection, thereby avoiding having to provide a separate touch-screen or the like. As mentioned previously, the vehicle switch 20 and the corresponding methodology are particularly suitable for vehicles lacking an in-vehicle infotainment (IVI) system. While the method is looking for previously paired mobile devices and/or confirming the identity of the mobile device that the user wants to connect, the method may send a signal to the switch indicator 34 causing it to display a slower blinking color, like blue, thereby indicating that the method is searching for previously paired devices. Once the user has selected the previously paired mobile device that they would like to connect, the method proceeds to step 320.

In step 320, the method automatically connects the confirmed or identified mobile device 26 with one or more components of the vehicle electronics system 24, such as a body control module (BCM) 80 and/or any other component that already has wireless communication capabilities (e.g., is Bluetooth enabled). Any suitable wireless communication connection process or protocol may be used, as the present method is not limited to any particular one. Step 320 may also set the Mode setting to a certain value, like "2," and send a signal to the switch indicator 34 causing it to display a constant or non-blinking color, like blue, thereby indicating to the user that the mobile device 26 and/or vehicle electronics system 24 are now connected. At this point, the automatic connection process 260 is complete and the method may end or loop back to the beginning of FIG. 4 for further monitoring.

Figure 6:
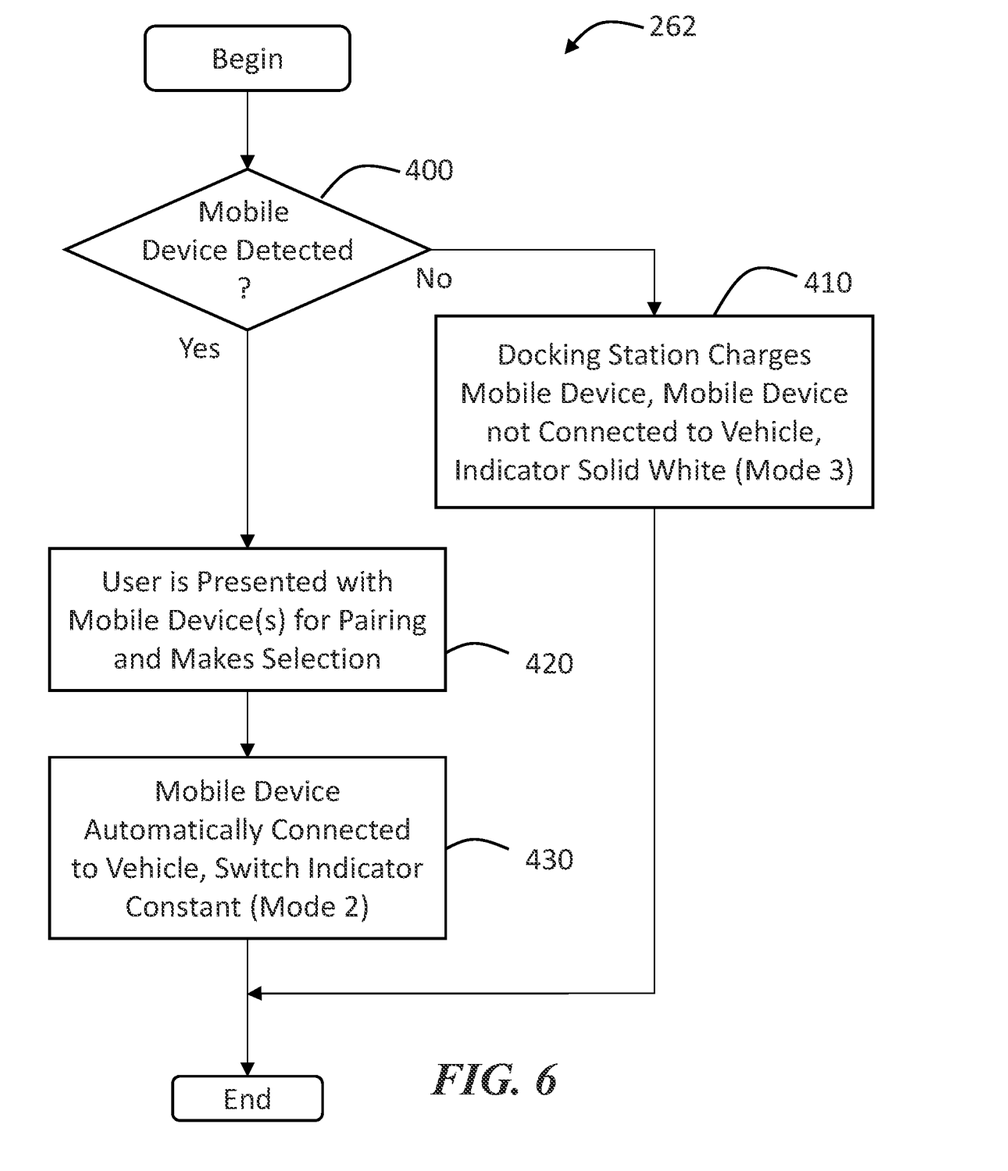
FIG. 6 is a flowchart of an example of a manual connection process step that may be used with the method of FIG. 4.

Returning to FIG. 4, if the mobile device has not previously been paired with the vehicle, then control passes to step 262 in order to initiate a manual connection process. FIG. 6 shows a more detailed flowchart of an example of how the manual connection process of step 262 may be carried out. For context, the manual connection process is encountered when: the vehicle is "on" (step 210), the user has engaged a "long press" of the switch component 32 (step 230) thereby indicating their desire to connect a mobile device to the vehicle, but the mobile device in question has not previously been paired with the vehicle (step 250). In this scenario, the method assumes that the user wants to connect a mobile device to the vehicle, but since no mobile device has been previously paired, the method must interact with the user to obtain their mobile device selection. During this process, the method may send a signal to the switch indicator 34 causing it to display a faster blinking color, like blue, thereby indicating that the method is ready to pair with a new mobile device. This "discoverable mode" may continue until the user has provided their input or it may only continue for a certain period of time (e.g., 120 sec). Other options are certainly possible.

At step 400, the method searches for a nearby mobile device with wireless communication capabilities (e.g., Bluetooth capabilities). If none are detected, then the method proceeds to step 410 where the Mode setting is set to a predetermined value, such as "3." In addition, step 410 ensures that the docking station 22 continues to be available for charging, and sends a signal to the switch indicator 34 causing it to display the predetermined color, like white, that indicates the mobile device is not connected to the vehicle electronics system 24. At this point, the manual connection process 262 and/or the main method 200 may end or loop back to the beginning for further monitoring.

If one or more nearby mobile devices with wireless communication capabilities are detected, then the manual connection process proceeds to step 420. Similar to the process in step 310, the method in step 420 may present the user with a list of available mobile devices for selection by visually displaying the devices on the instrument panel 16 or by audibly presenting the devices through the speakers 90, to cite several possibilities. In the event that only one mobile device is detected, step 420 may simply ask the user to confirm that this is the device intended for pairing. Any suitable technique may, of course, be used to present this information and gather the user's selection, including those mentioned above, as well as others.

Step 430 utilizes a process, not unlike that in step 320, to connect the mobile device in question to the vehicle electronics system 24. Now that the intended mobile device 26 has been manually selected or confirmed by the user, step 430 may connect the mobile device 26 with one or more components of the vehicle electronics system 24. Any suitable wireless communication connection process or protocol may be used. Step 430 can also set the Mode setting to the designated value, such as "2," and send a signal to the switch indicator 34 causing it to display a constant or non-blinking color, like blue. This indicates that the mobile device 26 and/or vehicle electronics system 24 are now connected. At this point, the manual connection process 262 is complete and the method may end or loop back to the beginning of FIG. 4 for further monitoring.

What is claimed is:

1. A vehicle switch system for connecting a mobile device to a vehicle electronics system, comprising:
    a vehicle switch including a switch housing, a switch component, a switch indicator, and a plurality of switch connections;
    the switch housing includes an outer switch housing piece that at least partially surrounds the switch component and the switch indicator;
    the switch component is a switching device;
    the switch indicator is a visual indicating device and includes an illuminated piece, the illuminated piece is configured to indicate the connectivity status of the mobile device and/or the vehicle electronics system; and
    the plurality of switch connections includes a first switch connection that is configured for direct or indirect connection to at least one of a vehicle power supply or a docking station, and a second switch connection that is configured for direct or indirect connection to the vehicle electronics system; and
    wherein the vehicle switch system is configured to facilitate connecting the mobile device to the vehicle electronics system so that one or more feature(s) and/or function(s) of the mobile device can be accessed and utilized through the vehicle electronics system, wherein the vehicle switch is adapted so that a first actuation of the switch component enables the first switch connection but not the second switch connection, and a second actuation of the switch component, that is different than the first actuation, enables the second switch connection for connection to the vehicle electronics system, wherein the first actuation of the switch component configures the switch component to allow power to flow from the vehicle power supply to the mobile device.

2. The vehicle switch system of claim 1, wherein the first actuation and the second actuation both involve movement of the switch component from a first position to a second position, and the first actuation is one of: a) a shorter duration of actuation of the switch component to the second position than the second actuation; or b) a different number of actuations of the switch component to the second position than the second actuation.

3. The vehicle switch system of claim 1, wherein the switch component is an electro-mechanical switching device and includes an on/off power button that is provided in the form of a momentary, normally open, push-button switch.

4. The vehicle switch system of claim 1, wherein the switch component includes an actuator piece that is configured for engagement by a user, the actuator piece includes a front face with indicia that indicates its functionality.

5. The vehicle switch system of claim 1, wherein the switch indicator includes a non-illuminated piece and the illuminated piece, the non-illuminated piece has a cutout that is sized to accommodate the illuminated piece, the illuminated piece has a light emitting diode (LED) that is configured to change its illumination color and/or pattern in order to indicate the connectivity status of the mobile device and/or the vehicle electronics system.

6. The vehicle switch system of claim 1, wherein the switch component has a semi-circular shape with one portion of its periphery being arcuate and another portion of its periphery being flat or linear, the switch indicator also has a semi-circular shape with one portion of its periphery being arcuate and another portion of its periphery being flat or linear, and the semi-circular shapes of the switch component and switch indicator are complimentary such that a combined shape of the switch component and the switch indicator forms a full circular shape.

7. The vehicle switch system of claim 1, wherein the first switch connection is configured for direct or indirect connection to at least one of the vehicle power supply or the docking station so that, when the switch component is engaged by a user, power is provided from the vehicle power supply to the docking station in order to charge the mobile device.

8. The vehicle switch system of claim 1, wherein the second switch connection is configured for direct or indirect connection to the vehicle electronics system via a vehicle communications network so that, when the switch component is engaged by a user, system signals are provided from the vehicle switch to the vehicle electronics system in order to facilitate a wireless connection between the mobile device and the vehicle electronics system.

9. The vehicle switch system of claim 1, further comprising a docking station including a station frame, one or more station retaining piece(s), and a station charging feature, wherein the station retaining feature(s) are configured to retain or hold the mobile device in place and the station charging feature is configured to charge the mobile device.

10. The vehicle switch system of claim 9, wherein the docking station is directly or indirectly connected to the first switch connection of the vehicle switch, and the docking station is configured to charge the mobile device with power from the vehicle power supply in response to either the first actuation or the second actuation of the switch component by a user.

11. The vehicle switch system of claim 9, wherein the vehicle switch and the docking station are connected to one another and are mounted to a dashboard within a vehicle interior.

12. The vehicle switch system of claim 1, further comprising switch circuitry that includes an electronic control unit that is connected to the switch component for determining actuation of the switch component according to the first actuation and the second actuation, to the switch indicator for sending indicator command signals, and to the vehicle electronics system for sending and/or receiving system signals.

13. A vehicle switch system for connecting a mobile device to a vehicle electronics system, comprising:
  a vehicle switch including a switch housing, a switch component, a switch indicator, and a plurality of switch connections; and
  switch circuitry that includes an electronic control unit that is connected to the switch component for receiving user selection signals, to the switch indicator for sending indicator command signals, and to the vehicle electronics system for sending and/or receiving system signals;
    the switch housing includes an outer switch housing piece that at least partially surrounds the switch component and the switch indicator;
    the switch component is a switching device;
    the switch indicator is a visual indicating device and includes an illuminated piece, the illuminated piece is configured to indicate the connectivity status of the mobile device and/or the vehicle electronics system; and
    the plurality of switch connections includes a first switch connection that is configured for direct or indirect connection to at least one of a vehicle power supply or a docking station, and a second switch connection that is configured for direct or indirect connection to the vehicle electronics system;
  wherein the vehicle switch system is configured to facilitate connecting the mobile device to the vehicle electronics system so that one or more feature(s) and/or function(s) of the mobile device can be accessed and utilized through the vehicle electronics system, and wherein the switch circuitry further includes a computer-readable storage medium that comprises instructions that, when executed by the electronic control unit, cause the electronic control unit to:
    determine a user selection of the switch component based on a duration or amount of time with which the user engages the switch component; and
    when a short press is determined, enable a docking station to charge the mobile device and display a first color and/or pattern with the switch indicator to indicate that the mobile device is not connected to the vehicle electronics system; and
    when a long press is determined, enable a docking station to charge the mobile device, initiate a process to connect the mobile device to the vehicle electronics system, and display a second color and/or pattern with the switch indicator to indicate that the mobile device is connected to the vehicle electronics system or is in the process of being connected to the vehicle electronics system.

14. The vehicle switch system of claim 13, when the short press is determined and the mobile device is already connected to the vehicle electronics system, then the electronic control unit initiates a process to disconnect the mobile device from the vehicle electronics system.

15. The vehicle switch system of claim 13, when the long press is determined, then the electronic control unit initiates either an automatic connection process or a manual connection process, the automatic connection process is initiated when the mobile device has previously been paired with the vehicle electronics system, whereas the manual connection process is initiated when the mobile device has not previously been paired with the vehicle electronics system.

16. The vehicle switch system of claim 1, wherein the vehicle switch system is configured to facilitate connecting the mobile device to the vehicle electronics system without the use of an in-vehicle infotainment (IVI) system so that one or more features and/or functions of the mobile device can be accessed and utilized through the vehicle electronics system, without the need for an IVI system.

17. The vehicle switch system of claim 1, wherein the vehicle switch system is configured to receive a plurality of different user selections with the use of a single switch component and actuator piece of a push button switch that has a first position and a second position, wherein one user selection is associated with the first actuation of the actuator piece from the first position to the second position, and another user selection is associated with the second actuation of the actuator piece from the first position to the second position.

18. A method of using a vehicle switch system that includes a vehicle switch having a switch component and a switch indicator, the switch component is a switching device and includes an actuator piece configured for engagement by a user, the switch indicator is a visual indicating device and includes an illuminated piece configured to indicate the connectivity status of a mobile device and/or a vehicle electronics system, the method comprising the steps of:
  detecting when a user engages the switch component;
  determining a user selection based on a duration or amount of time with which the user engages the switch component;
  when a short press is determined, enabling a docking station to charge the mobile device and displaying a first color and/or pattern with the switch indicator to indicate that the mobile device is not connected to the vehicle electronics system; and
  when a long press is determined, enabling a docking station to charge the mobile device, initiating a process to connect the mobile device to the vehicle electronics system, and displaying a second color and/or pattern with the switch indicator to indicate that the mobile device is connected to the vehicle electronics system or is in the process of being connected to the vehicle electronics system.

* * * * *